United States Patent [19]
Kadowaki

[11] Patent Number: 6,141,181
[45] Date of Patent: Oct. 31, 2000

[54] MAGNETIC DISK APPARATUS WITH FLOATING SLIDERS HAVING OBLIQUELY MOUNTED RAILS

[75] Inventor: Yoshinori Kadowaki, Higashine, Japan

[73] Assignee: Fujitsu Limited, Kawasaki, Japan

[21] Appl. No.: 08/389,069

[22] Filed: Feb. 14, 1995

Related U.S. Application Data

[63] Continuation of application No. 08/064,958, May 20, 1993, abandoned.

[30] Foreign Application Priority Data

May 22, 1992 [JP] Japan ................................. 4-131068

[51] Int. Cl.$^7$ ................................................. G11B 21/21
[52] U.S. Cl. ........................................... 360/103; 360/104
[58] Field of Search ................................ 360/103, 106, 360/97.01, 98.01, 104

[56] References Cited

U.S. PATENT DOCUMENTS

| | | | |
|---|---|---|---|
| 5,012,367 | 4/1991 | Toensing | 360/106 |
| 5,299,079 | 3/1994 | Kuroda | 360/103 |

FOREIGN PATENT DOCUMENTS

| | | | |
|---|---|---|---|
| 60-47278 | 3/1958 | Japan | 360/103 |
| 61-246974 | 11/1986 | Japan . | |
| 62-42374 | 2/1987 | Japan . | |
| 1-48220 | 2/1989 | Japan | 360/103 |
| 2161667 | 6/1990 | Japan . | |
| 2281486 | 11/1990 | Japan | 360/103 |
| 3-230379 | 10/1991 | Japan . | |
| 3-283150 | 12/1991 | Japan . | |
| 4-57260 | 2/1992 | Japan . | |
| 4-271074 | 9/1992 | Japan . | |
| 4355292 | 12/1992 | Japan | 360/103 |

*Primary Examiner*—Jefferson Evans
*Attorney, Agent, or Firm*—Greer, Burns & Crain, Ltd.

[57] ABSTRACT

A magnetic disk apparatus comprising magnetic disks and a magnetic head assembly including a rotatable head carriage with a hub and head arms extending from the hub in a line. A floating slider is carried by each of the head arms and the sliders have magnetic heads for access to the surfaces of the magnetic disks. Parallel rails are arranged on the surface of the floating slider facing the associated surface of the magnetic disk. The floating slider has a longitudinal central axis extending generally parallel to the longitudinal central axis of the associated head arm and the rails extend obliquely to the longitudinal central axis of the body. The floating slider is arranged so that, when the floating slider is positioned on the innermost track, the angle the rails form with the tangent to the innermost track is substantially zero, so as to reduce the variation in the flying height of the floating slider from the magnetic disk, without reducing the recording capacity.

8 Claims, 13 Drawing Sheets

MAGNETIC DISK APPARATUS WITH FLOATING SLIDERS HAVING OBLIQUELY MOUNTED RAILS

RELATED APPLICATION

This is a continuation of application Ser. No. 08/064,958, filed on May 20, 1993, now abandoned.

BACKGROUND OF THE INVENTION

1. Field of the Invention

The present invention relates to a magnetic disk apparatus used in a computer system and, more specifically, the present invention relates to a magnetic disk apparatus including a plurality of magnetic disks and a magnetic head assembly with improved floating sliders having magnetic heads secured thereto and carried by head arms moving radially over the magnetic disks to access to the magnetic disks for reading and writing data.

2. Description of the Related Art

A magnetic disk apparatus comprises a plurality of coaxially arranged magnetic disks and a magnetic head assembly including a rotatable or swingable head carriage which comprises a hub and a plurality of head arms extending from the hub in a line. Each of the head arms carries two floating sliders each of which secures one or two magnetic heads for reading and writing data on the magnetic disks. The floating slider has a pair of parallel rails on the surface thereof facing the associated surface of the magnetic disk to act as an air bearing while the magnetic disk is rotating, so that the floating slider flies above the surface of the magnetic disk by a certain distance against an elastic bias applied to the floating slider.

Floating sliders are disclosed in, for example, Japanese Unexamined Patent Publication (Kokai) No. 3-283150, No. 61-246974, No. 62-42374, No. 4-271074, No. 4-57260, and 3-230379.

One of the problems of floating sliders is that there is a variation in the flying height of the floating slider above the surface of the magnetic disk while the magnetic disk is rotating and the floating slider moves from the innermost track to the outermost track of the magnetic disk or vice versa. The flying height of the floating slider above the magnetic disk is a function of an amount of air which is dragged, by the motion of the disk, between the slider and the rotating magnetic disk. If the magnetic disk is rotating at a constant rate, the speed of the surface of the magnetic disk varies depending on the radial position of the surface. The amount of the wind which the floating slider receives varies according to which track (radial position) of the magnetic disk the floating slider is positioned on. Thus the floating slider is closer to the magnetic disk when the floating slider is positioned on a radially inner track of the magnetic disk and the floating slider is further from the disk when it is positioned on a radially outer track.

In addition, the flying height of the floating slider above the magnetic disk varies depending on the angle that the rails of the floating slider form with the tangent line to the track of the magnetic disk over which the floating slider is positioned. Conventionally, the magnetic disk apparatus is designed such that the rails are parallel to the longitudinal axis of the floating slider, and when the floating slider is positioned on an intermediate track the angle the rails on the floating slider form with the tangent to the radially intermediate track is zero. The floating slider is thus able to fully accept the air flow caused by the rotating magnetic disk when the floating slider is positioned on the intermediate track. If the floating slider is positioned either on the radially inner or outer track, the angle the rails of the floating slider form with the tangent line of that track is not zero but a certain value, and the floating slider receives the wind from an oblique angle, resulting in a reduction of the flying height of the floating slider.

Accordingly, the flying height of the floating slider above the magnetic disk is small when the floating slider is positioned on the radially inner track due to the low peripheral speed and the angle between the floating slider and the tangent line on the radially inner track, and the flying height of the floating slider above the magnetic disk is large when the floating slider is positioned on the radially outer track which has a high peripheral speed. Accordingly, the variation in the flying height of the floating slider above the magnetic disk depends on whether the floating slider is positioned on the radially inner track or on the radially outer track. For example, the difference in the flying heights in the conventional design may be 0.06 to 0.08 microns.

This difference in the flying height becomes a problem in recent magnetic disk apparatuses, in particular, in apparatuses which use a zone bit recording system in which the data transfer speed is varied depending on the radial position of the magnetic disk to keep the recording density uniform throughout the magnetic disk, irrespective of the position of the magnetic head.

SUMMARY OF THE INVENTION

The object of the present invention is to provide a magnetic disk apparatus including a floating slider which can maintain a generally constant distance from the surface of the magnetic disk when the floating slider is positioned on any track on the magnetic disk.

According to the present invention, there is provided a magnetic disk apparatus comprising a plurality of coaxially arranged magnetic disks having respective opposite surfaces, a magnetic head assembly including a rotatable head carriage with a hub and a plurality of head arms extending from the hub in a line, each of the head arms having a longitudinal central axis, at least one floating slider carried by each of the head arms and having at least one magnetic head for access to one of the surfaces of the magnetic disks, and the floating slider comprising a body having a longitudinal central axis extending generally parallel to the longitudinal central axis of the associated head arm and a first surface adapted to face the surface of the magnetic disk, and at least one rail arranged on the first surface of the floating slider and extending obliquely to the longitudinal central axis of the body.

BRIEF DESCRIPTION OF THE DRAWINGS

The present invention will become more apparent from the following description of the preferred embodiments, with reference to the accompanying drawings, in which.

DESCRIPTION OF THE PREFERRED EMBODIMENTS

Figure 3:
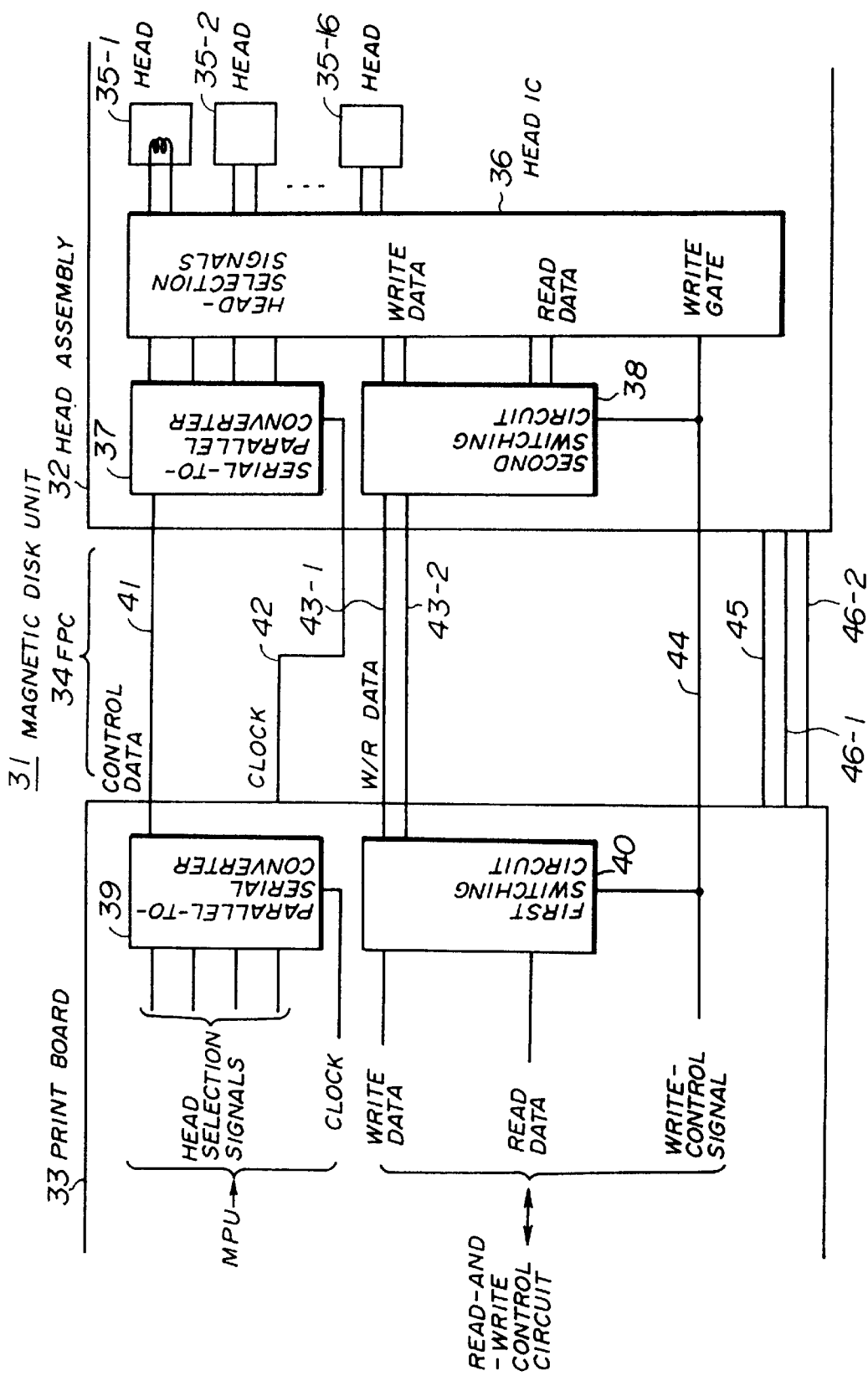
FIG. 3 is a horizontal cross-sectional view of the magnetic disk apparatus.
Figure 4:
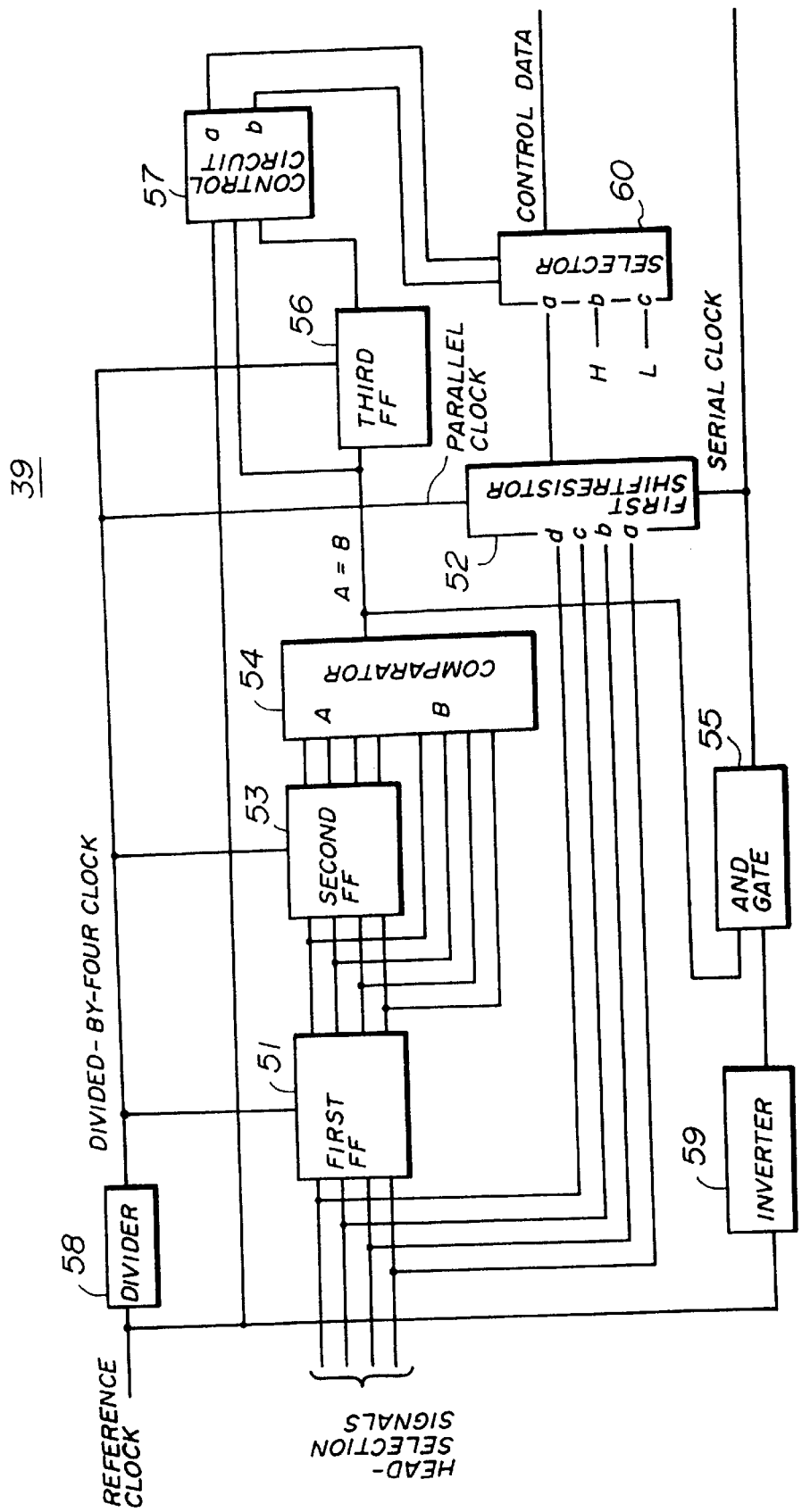
FIG. 4 is a perspective view of the head carriage of FIG. 3, with a portion of the enclosure being partially cut away.

Referring to FIGS. 3 and 4, the magnetic disk apparatus comprises an enclosure 21 which sealingly accommodates the components of the magnetic disk apparatus. The enclosure 21 includes a base 21a to which a spindle 22 is rotatably mounted, the spindle 22 being driven in rotation by a spindle motor (not shown). A plurality of magnetic disks 23 are secured to the spindle 22 at constant intervals and rotate in the direction of the arrow X. Each of the magnetic disks 23 includes concentric tracks on both surfaces thereof, the tracks being usually formed between an inner guard zone (IT) and an outer guard zone (OT).

A magnetic head assembly 24 comprises a head carriage including a hub 30 rotatably mounted to the base 21a and a plurality of head arms 31 integrally extending from the hub 30 in a line. As will be apparent, each of the head arms 31 are inserted between two adjacent magnetic disks 23. The hub 30 of the head carriage is connected to a moving-coil-type motor 26 including a coil 25 connected to the hub 30. The coil 25 is arranged in a magnetic circuit and moved by supplying electric current to the coil 25 to thus rotate or swing the head arms 31 generally radially over the magnetic disks 23.

Each of the head arms 31 includes at the free end thereof two spring arms 33 which support floating sliders 35 via gimbal springs (not shown), as is well known. Each of the floating sliders 35 has one or two magnetic heads 13 secured thereto (FIGS. 1 and 2) for access to the respective surface of the magnetic disk 23. Each of the head arms 31 with the spring arms 33 is configured in an elongated straight shape and has a longitudinal central axis $C_1$ (FIG. 1).

Figure 1:
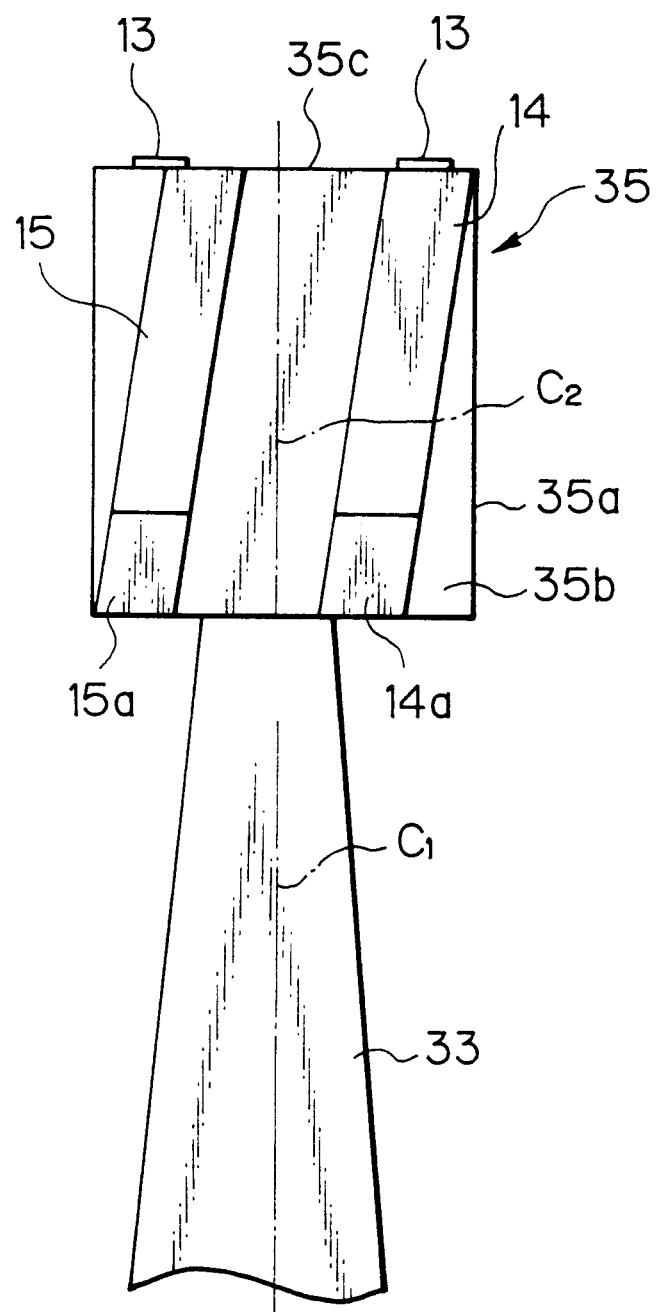
FIG. 1 is a top view of a floating slider of the magnetic disk apparatus of FIGS. 3 and 4 according to the embodiment of the present invention.
Figure 2:
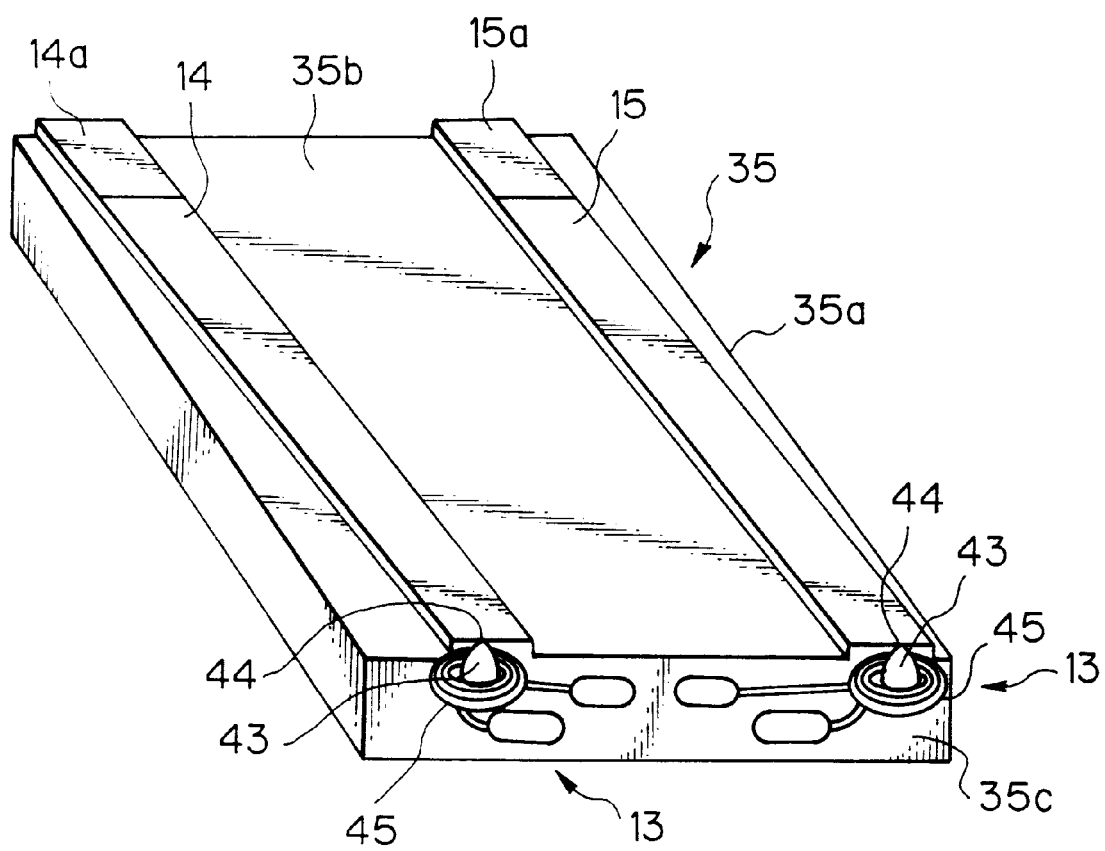
FIG. 2 is a perspective view of the floating slider of FIG. 1, viewed from the rear of the floating slider.

As shown in FIGS. 1 and 2, the floating slider 35 comprises a body 35a in a generally rectangular parallelepiped shape and having a longitudinal central axis $C_2$ which extends generally parallel to the longitudinal central axis $C_1$ of the associated head arm 31 (and spring arm 33). The body 35a of the floating slider 35 has a first surface 35b adapted to face the surface of the magnetic disk 23 and a rear surface 35c, viewed from the direction of the rotation of the magnetic disks 23, shown by the arrow X in FIGS. 3 and 4.

A pair of parallel rails 14 and 15 are arranged on the first surface 35b of the floating slider 35 to constitute an air bearing to allow the floating slider 35 to fly above the facing surface of the magnetic disk 23 while the magnetic disk 23 is rotating. According to the present invention, the rails 14 and 15 extend obliquely to the longitudinal central axis $C_2$ of the body 35a, and thus to the longitudinal central axis $C_1$ of the head arm 31. The inclination of the rails relative to the longitudinal central axis $C_2$ is decided according to the radius of the innermost track of the magnetic disk 23, the position of the center of rotation of the magnetic head assembly 24, and the length of the head arm 31 from the center of rotation of the magnetic head assembly 24 to the floating slider 35. The rails 14 and 15 include tapered portions 14a and 15a extending toward the front of the floating slider 35, respectively.

Each of the floating sliders 35 has two magnetic heads 13 on the rear surface 35c of the body 35. The magnetic heads 13 comprise thin film magnetic heads each of which comprises a magnetic circuit element 43 with a magnetic gap 44 and a coil 45, as is well known. Each of the magnetic gaps 44 is located at the position of each of the rails 14 and 15. Usually, one of two magnetic heads 13 is used. It is possible to provide only one magnetic head 13 on each of the floating sliders 35.

Figure 8:
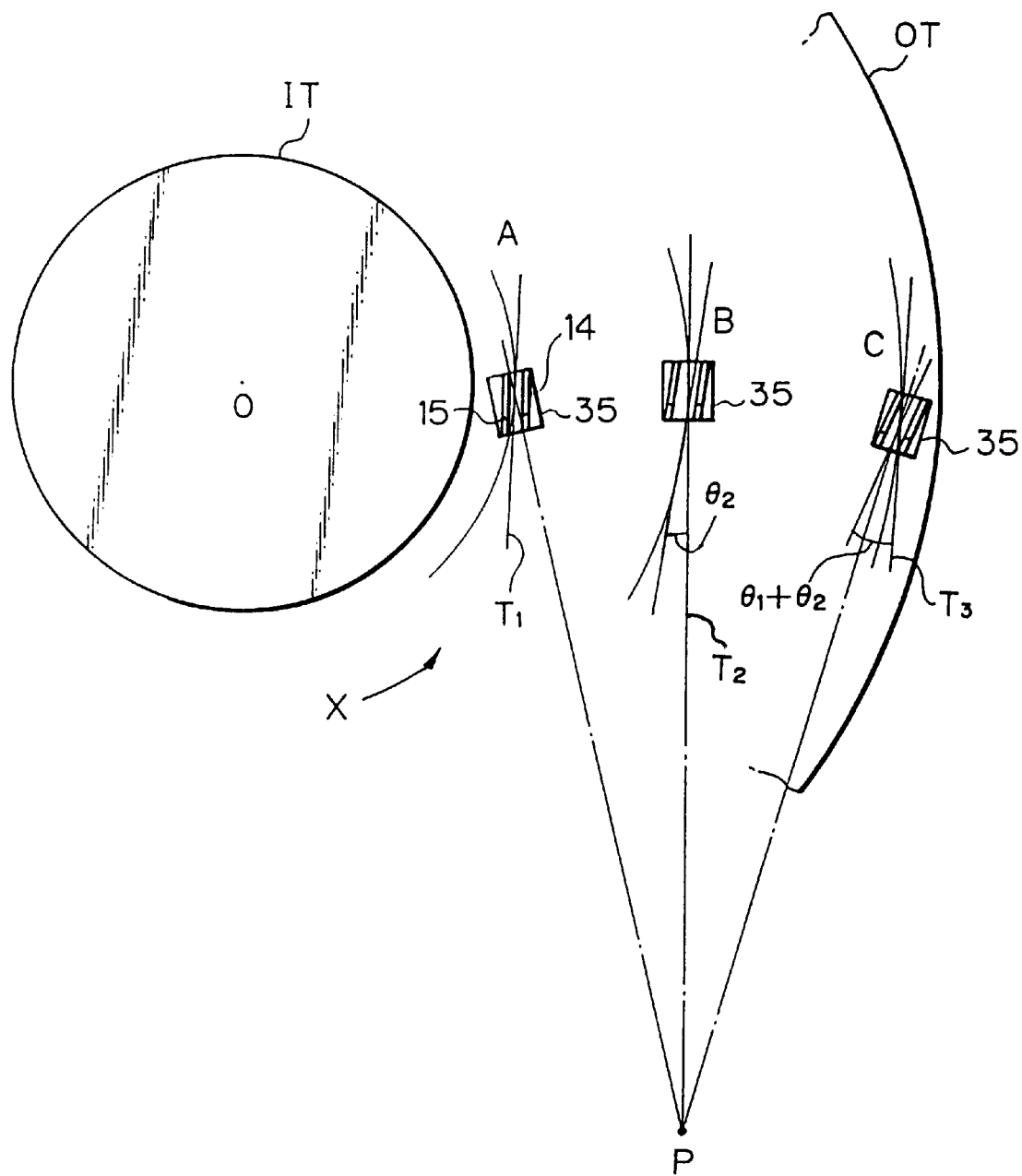
FIG. 8 is a plan view illustrating the arrangement of the floating slider relative to the magnetic disk.

As shown in FIG. 8, the floating slider 35 is preferably arranged so that, when the floating slider 35 is positioned on the innermost track (shown at the position A), an angle formed between the rails 14 and 15 and a tangent line $T_1$ to the innermost track is substantially zero. In FIG. 8, the character O is the center of the magnetic disks 23, and the character P is the center of rotation of the magnetic head assembly 24. Accordingly, when the floating slider 35 is positioned on the radially intermediate track (shown at the position B), the angle the rails 14 and 15 form with the tangent line $T_2$ to the intermediate track is $\theta_2$, and when the floating slider 35 is positioned on the outermost track (shown at the position C), the angle the rails 14 and 15 form with a tangent line $T_3$ to the outermost track is $\theta_1 + \theta_2$.

Figure 9:
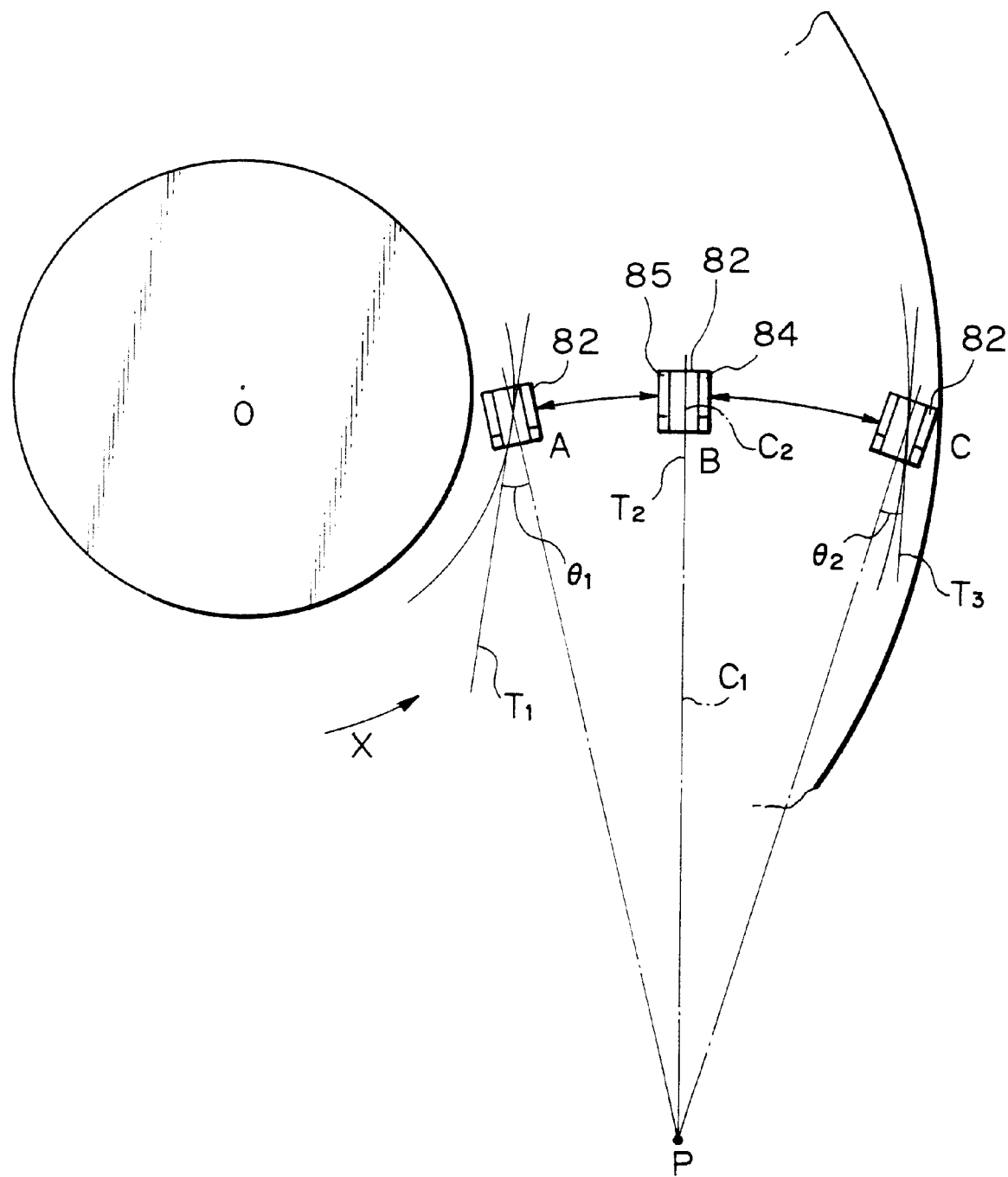
FIG. 9 is a similar plan view to FIG. 8 but illustrating the arrangement of a prior art.

FIG. 9 is the arrangement of a prior art including a floating slider 82 having rails 84 and 85 extending parallel to the longitudinal central axes $C_1$ and $C_2$. The apparatus is arranged such that, when the floating slider 82 is positioned on the radially intermediate track (shown at the position B), the angle the rails 84 and 85 form with a tangent line $T_2$ to the intermediate track is substantially zero. Accordingly, when the floating slider 82 is positioned on the innermost track (shown at the position A), the angle the rails 84 and 85 form with a tangent line $T_1$ to the innermost track is approximately $\theta_1$, and when the floating slider 82 is positioned on the outermost track (shown at the position C), the angle the rails 84 and 85 form with a tangent line $T_3$ to the outermost track is $\theta_2$.

Figure 5:
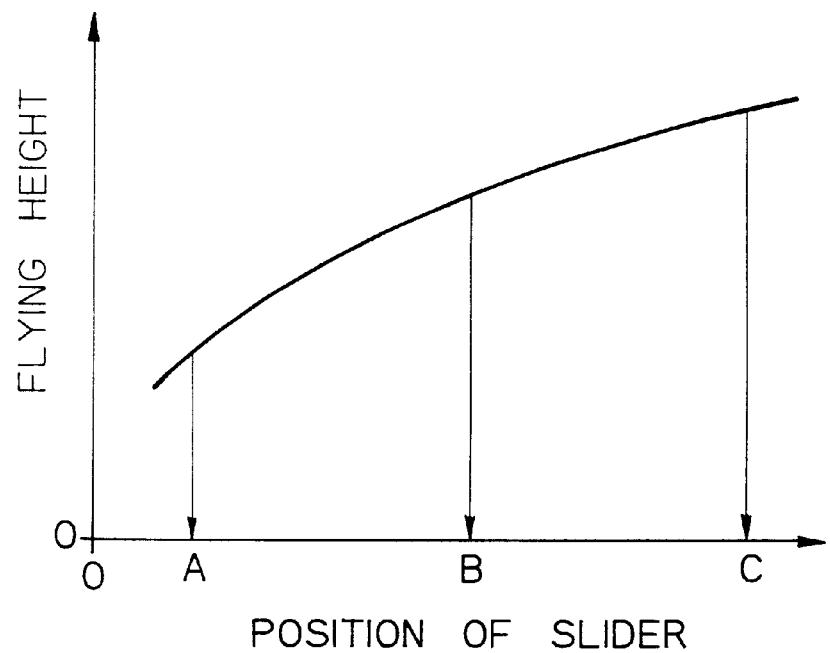
FIG. 5 is a graph illustrating the relationship of the flying height of the floating slider versus the position of the floating slider when the angle of the rails of the floating slider forming with the tangent line to the track of the magnetic disk is assumed constant.

FIG. 5 is a graph illustrating the relationship between the flying height of the floating slider 35 and the position of the floating slider 35 when the angle of the rails 14 and 15 the floating slider 35 forms with the tangent to the track of the magnetic disk 23 is held constant. It will be apparent that the flying height of the floating slider 35 above the surface of the associated magnetic disk 23 increases through the positions A to C since the speed of the disk surface increases as the radius increases. This relationship is also true of the floating slider 82 of FIG. 9.

Figure 6:
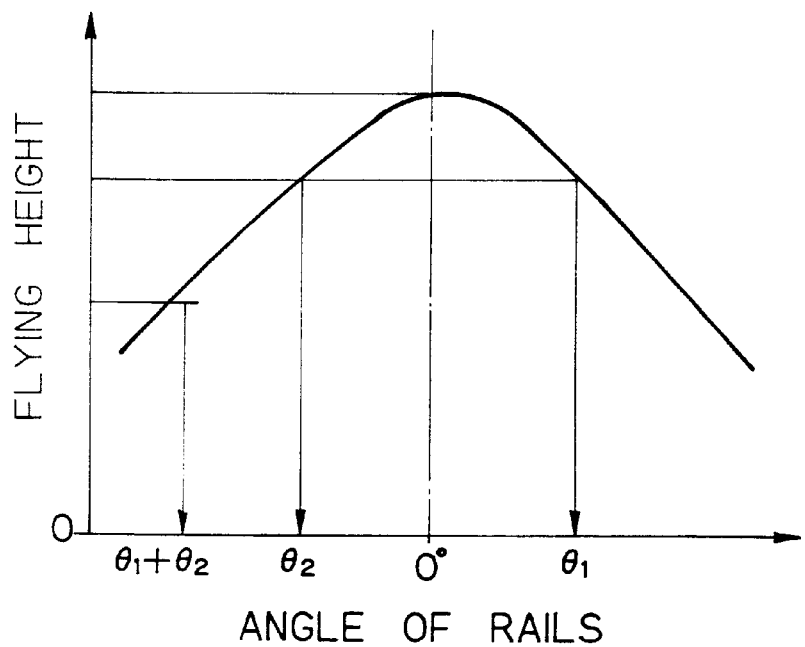
FIG. 6 is a graph illustrating the relationship of the flying height of the floating slider versus the angle of the rails of the floating slider forming with a tangent line to the track of the magnetic disk.

FIG. 6 is a graph illustrating the relationship between the flying height of the floating slider 35 and the angle the rails 14 and 15 of the floating slider 35 form with a tangent to the track of the magnetic disk 23 when the speed of the disk surface is held constant. This relationship also holds for the prior art floating slider 82. When the angle is zero, the floating slider 35 (82) is able to fully use the air flow caused by the rotating magnetic disk 23, and thus float to the greatest height. When the angle is not zero but a certain value, the floating slider 35 (82) receives the wind obliquely and a component of the wind coming from the front of the floating slider 35 (82) is reduced, and thus the flying height of the floating slider 35 (82) above the magnetic disk 23 is reduced. Note, the instant floating slider 35 is arranged in the range of the angles from (minus) $(\theta_1+\theta_2)$ to zero, and the prior art floating slider 82 is arranged in the range of angles from (minus) $\theta_2$ to $\theta_1$.

Figure 7:
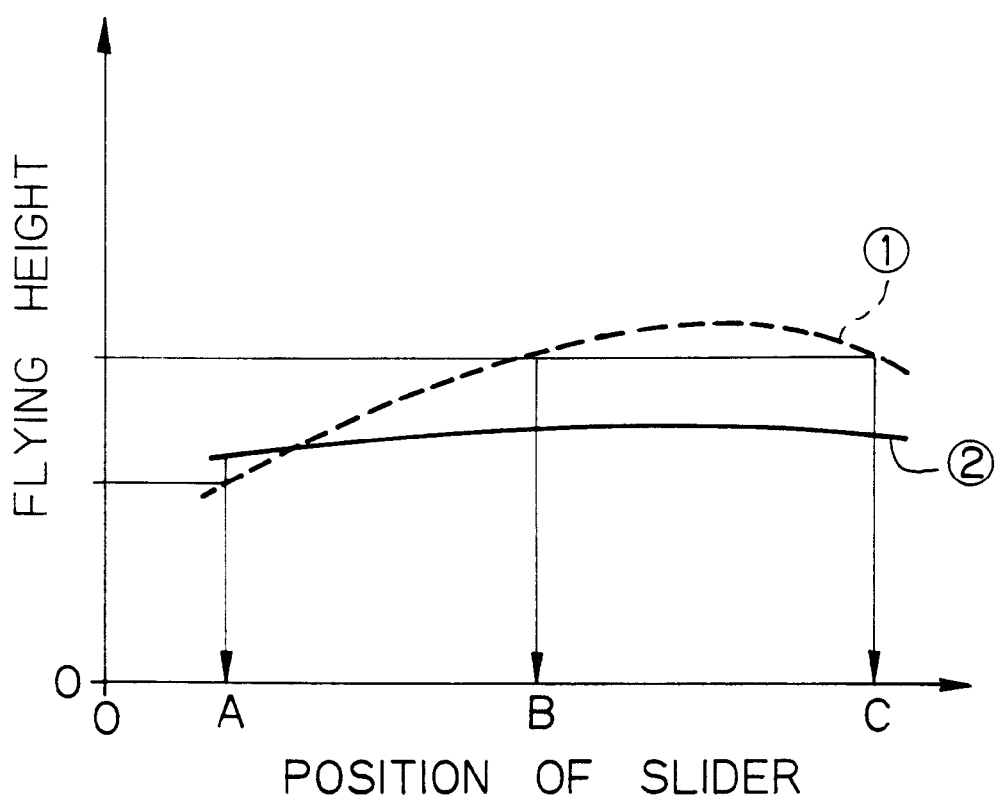
FIG. 7 is a graph illustrating the relationship between the flying height of the floating slider and the position of the floating slider when the rails are obliquely arranged on the floating slider, as shown in FIGS. 1 and 2.

The actual flying height of the floating slider 35 (82) is shown in FIG. 7, which is the multiplication of the profile of FIG. 5 with the profile of FIG. 6. The curve 1 shows the characteristic of the prior art obtained by multiplying a value of the distance of float at the position A of FIG. 5 with a value of the flying height at the angle $\theta_1$ of FIG. 6 and a value of the flying height at the position C of FIG. 5 with a value of the flying height at the angle $\theta_2$, and by plotting these values. The curve 2 shows the characteristic of the present invention obtained by multiplying a value of the flying height at the position A of FIG. 5 with a value the flying height at the angle zero of FIG. 6 and a value of the flying height at the position C of FIG. 5 with a value of the flying height at the angle $(\theta_1+\theta_2)$, and by plotting these values. It will be understood that the curve 2 is relatively flat and the variation in the distance of float or lift of the floating slider 35 from the surface of the magnetic disk 23 is considerably reduced, according to the present invention.

Figure 10:
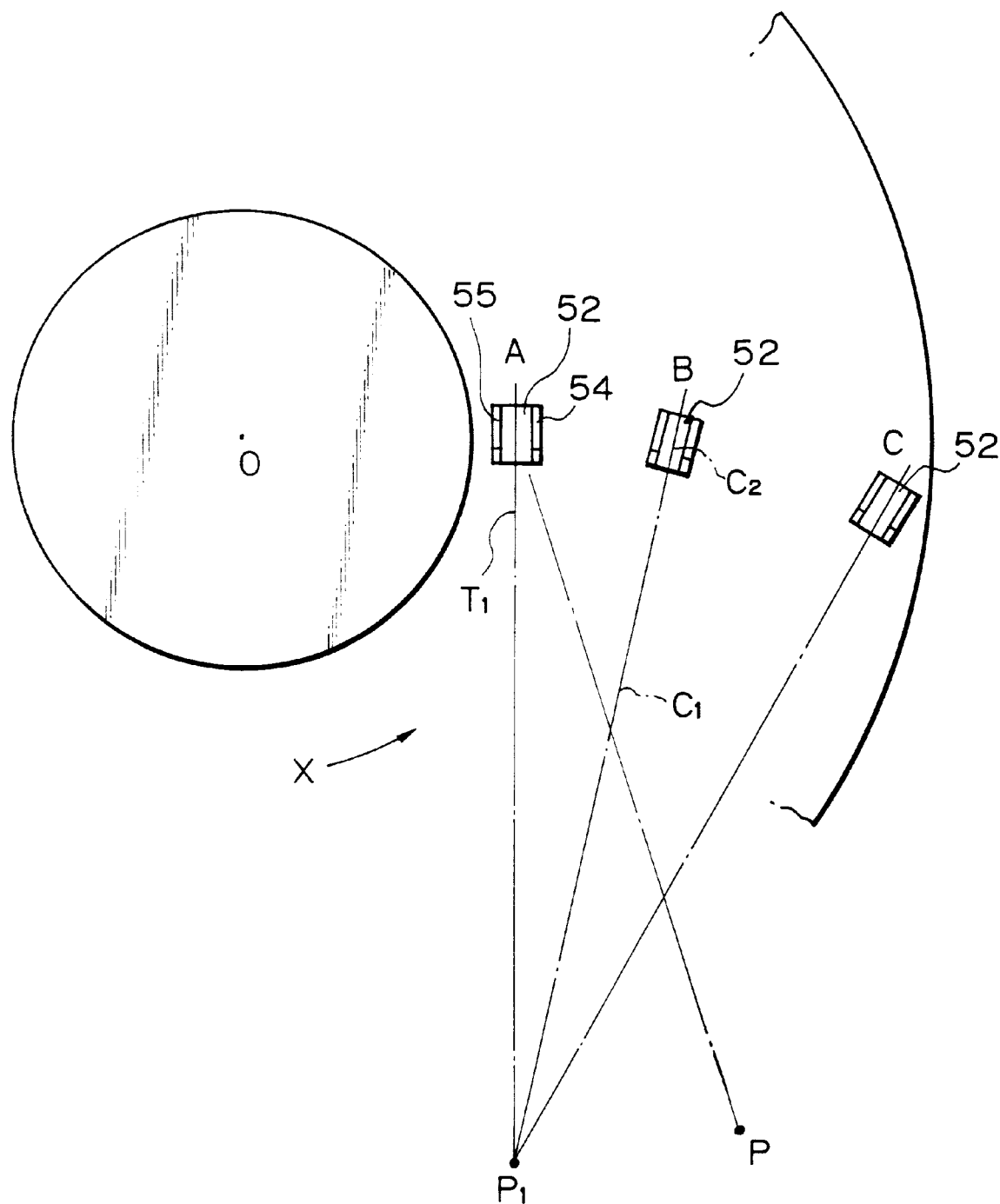
FIG. 10 is a similar plan view to FIG. 8 but illustrating the arrangement of a further prior art.

FIG. 10 shows a further prior art arrangement as, for example, disclosed in Japanese Unexamined Patent Publication (Kokai) No. 3-283150, in which a floating slider 52 has rails 54 and 55 extending parallel to the longitudinal central axes $C_1$ and $C_2$, and the apparatus is arranged such that, when the floating slider 52 is positioned on the innermost track (shown at the position A), an angle of the rails 54 and 55 forming with a tangent line $T_1$ to the innermost track is substantially zero. Since the arrangement of the rails 54 and 55 of FIG. 10 is similar to the arrangement of the rails 14 and 15 of FIG. 8, the prior art of FIG. 10 may present a similar effect to that of FIG. 8 and shown by the curve 2 in FIG. 7.

However, it is necessary to displace the center of the rotation of the magnetic head assembly 24 from the position P to the position $P_1$ to enable the arrangement of FIG. 10. This sometimes necessitates a change of the design of the entire arrangement including the enclosure 21 or a change of the design of the head arms 31. In this case, the head arms 31 may be formed in a bent shape or the length of the head arms 31 may be extended.

Figure 11:
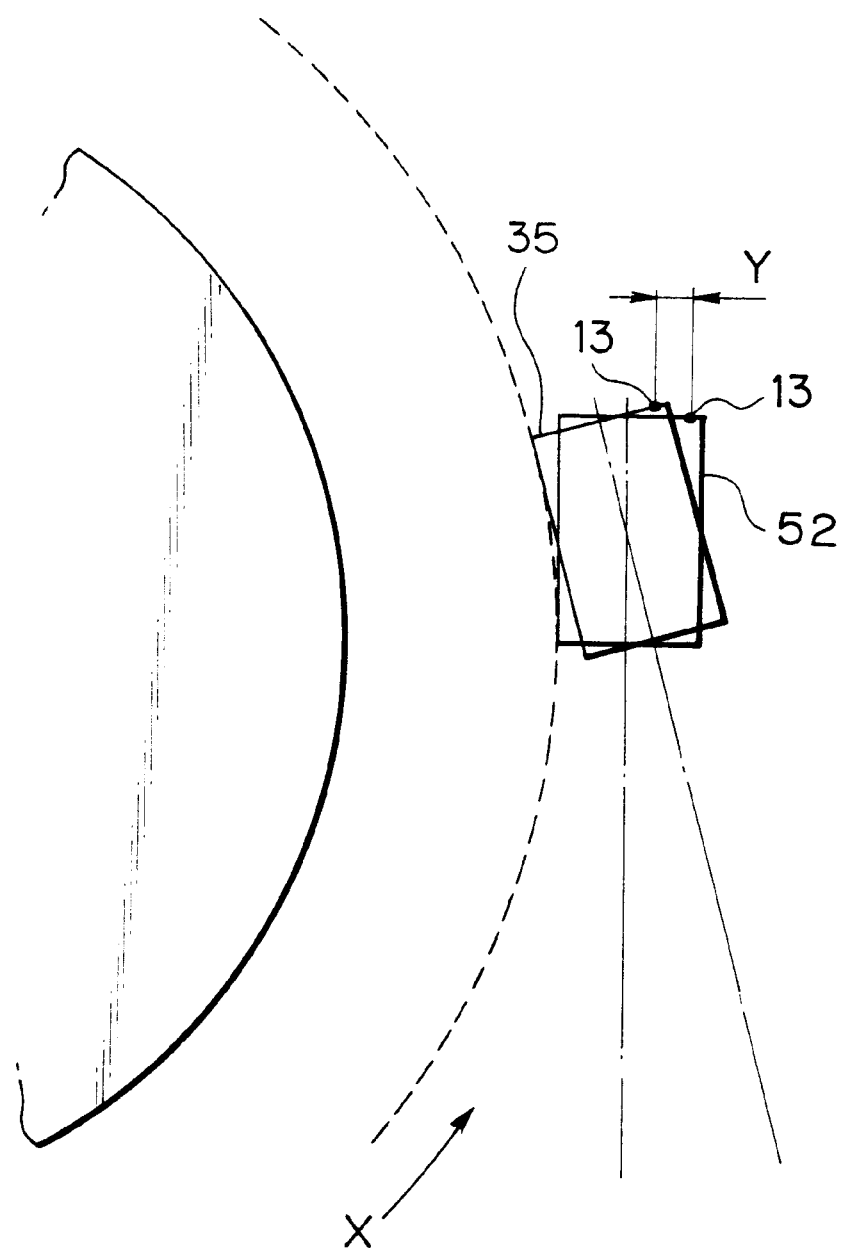
FIG. 11 is an enlarged view illustrating the floating slider of FIG. 8 and the floating slider of FIG. 10 positioned at the innermost portion of the magnetic disk.
Figure 12:
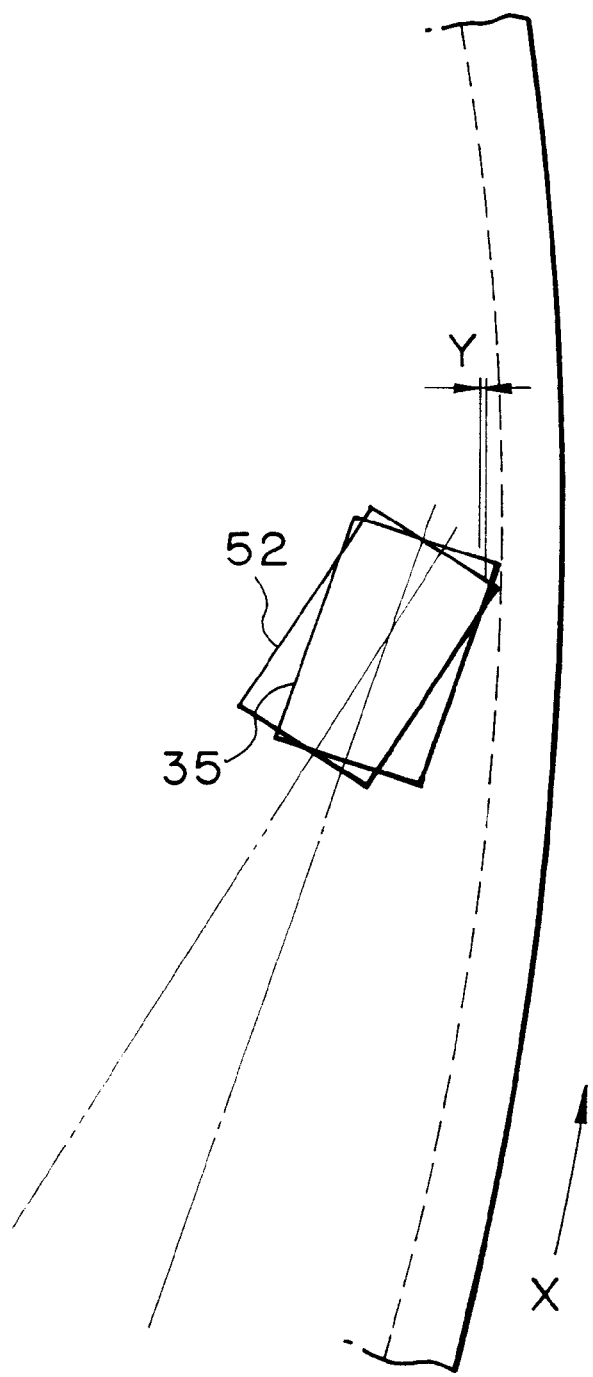
FIG. 12 is an enlarged view illustrating the floating slider of FIG. 8 and the floating slider of FIG. 10 positioned at the outermost portion of the magnetic disk.

In addition, a recording capacity is reduced according to the arrangement of FIG. 10. FIG. 11 shows the floating slider 35 of FIG. 8 and the floating slider 52 of FIG. 10 positioned at the innermost portion of the magnetic disk 23 and FIG. 12 shows the floating slider 35 of FIG. 8 and the floating slider 52 of FIG. 10 positioned at the outermost portion of the magnetic disk 23. Also, each of the floating sliders 35 and 52 are shown to have one magnetic head 13 corresponding to the right-hand one of FIG. 1. As described previously, the magnetic disk has an inner guard zone (IT) and an outer guard zone (OT) between which the floating slider 35 is adapted to float and thus the tracks are formed. The floating sliders 35 and 52 are shown at the innermost positions within the inner guard zone (IT) and the outer guard zone (OT) in FIGS. 11 and 12, respectively.

It will be understood from FIGS. 11 and 12 that there is a difference Y between the position of the magnetic head 13 of the floating slider 35 and the position of the magnetic head 13 of the floating slider 52 when the floating sliders 35 and 52 are at the respective innermost positions, as shown in FIG. 11. This means that a recording capacity is reduced according to the arrangement of FIG. 10. A difference between the position of the magnetic head 13 of the floating slider 35 and the position of the magnetic head 13 of the floating slider 52 when the floating sliders 35 and 52 are at the respective outermost positions is relatively small, as shown in FIG. 12.

Figure 13:
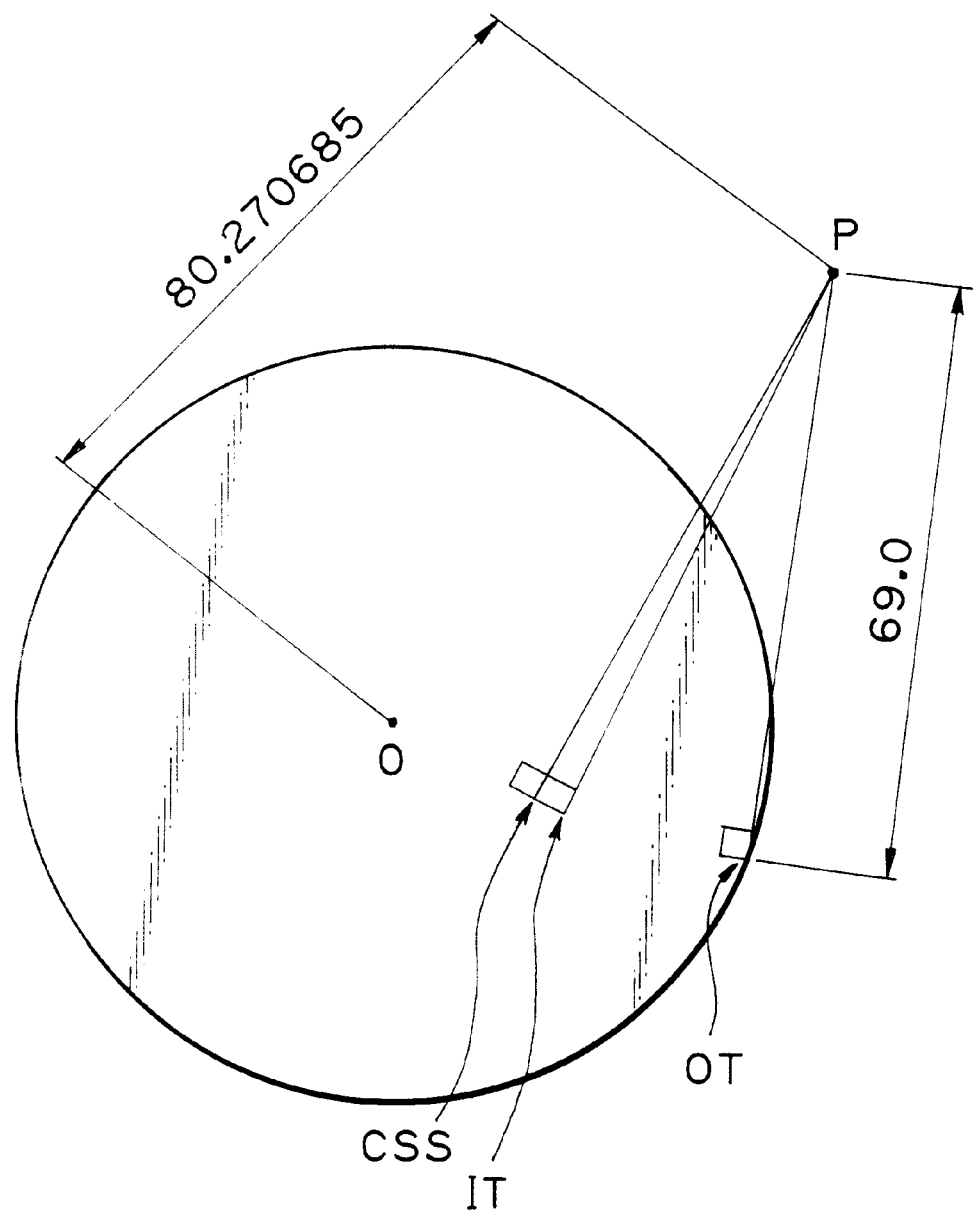
FIG. 13 is a diagrammatic view illustrating the dimensional arrangement of the present invention.

For example, the floating slider 35 is compared with the floating slider 52, using the 5.25" magnetic disk apparatus having a capacity of 2GB/DE and 20 recording surfaces, with reference to FIG. 13. As shown in FIG. 13, the distance between the center P of rotation of the magnetic head assembly 24 and the center O of the magnetic disks is 80.270685 mm, and the length of the head arm 31 from the center of rotation of the magnetic head assembly 24 to the floating slider 35 is 69.0 mm. In the embodiment, the inclination of the rails 14 and 15 of the floating slider 35 relative to the longitudinal central axis $C_2$ is 8.5 degrees, and the yawing angles of the floating slider 35 is as follows:

| Position of Slider on Disk | Radius (mm) | Peripheral Speed (m/s) | Yawing Angle (deg) |
|---|---|---|---|
| CSS | 31.8 | 18.0 | 11.1 |
| IT | 34.0 | 19.2 | 8.5 |
| OT | 60.1 | 34.0 | −13.1 |

Where CSS is the contact start and stop at which the floating slider 35 first and finally rests on the magnetic disk 23. IT is the innermost cylinder No. 1943, and OT is the outermost cylinder No. 0000. Data can be actually written in the region between IT and OT.

In the above arrangement, the difference Y between the recordable position of the magnetic head 13 of the floating slider 35 of the present invention at the innermost position and the recordable position of the magnetic head 13 of the floating slider 52 when the yawing angle of the floating sliders 35 and 52 is zero, is approximately 1.0 mm. The loss of the recording capacity can be calculated as follows:

$$\text{Loss} = 1000 \ \mu m / 7.0 \ \mu m \times 0.05 \ MB \times 20 \ (\text{surfaces})$$

$$= 142.9 \ MB/DE$$

where the pitch of the tracks is 7.0 $\mu$m, and the capacity of the cylinder is 0.05 MB/CYL. The calculated loss corresponds to 7.1% of 2GB/DE.

Accordingly, it is possible, according to the present invention, to reduce the variation in the flying height of the floating slider 35 above the surface of the magnetic disk 23, without reducing the recording capacity.

Figure 14:
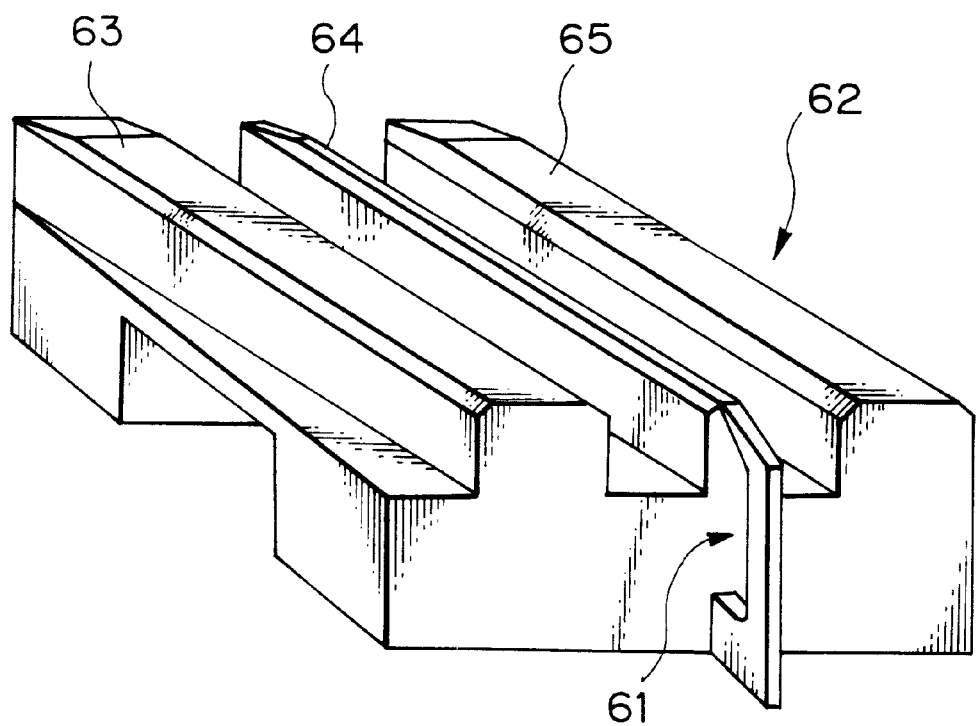
FIG. 14 is a perspective view of the floating slider according to the second embodiment of the present invention.

It will be understood that the present invention is not limited to the above illustrated embodiment. For example, thin film magnetic heads 13 are employed in the above illustrated embodiment, but it is possible to use a ferrite magnetic head 61, as shown in FIG. 14. In FIG. 14, the floating slider comprises three parallel rails 63 to 65 extending obliquely to the body of the floating slider. This floating slider can be arranged in FIG. 10 in place of the floating slider 35, so that, when the floating slider is positioned on the innermost track, the angle of the rails 63 to 65 to the tangent $T_1$ to the innermost track is substantially zero. Also, it is possible to constitute the magnetic head from an MIG head.

Two outer rails 63 and 65 mainly act as an air bearing and the central rail 64 acts as an element forming a magnetic gap with the ferrite magnetic head 61. The magnetic head 61 is arranged on the rear surface of the body of the floating slider and has a magnetic gap at a position between the rails 63 and 65.

What is claimed is:

1. A magnetic disk apparatus comprising:

a plurality of coaxially arranged magnetic disks having respective opposite surfaces and tracks arranged on said surfaces;

a magnetic head assembly including a rotatable head carriage with a hub and a plurality of head arms extending from the hub in a line, each of the head arms having a longitudinal central axis;

at least one floating slider having a body configured in a generally rectangular parallelepiped shape carried by each of the head arms and having at least one magnetic head for access of one of the surfaces of the magnetic disks;

said body having a longitudinal central axis extending generally parallel to the longitudinal central axis of the associated head arm and a first surface adapted to face the surface of the magnetic disk, and at least two parallel rails arranged on the first surface of the floating slider, extending obliquely to the longitudinal central axis of the body and defining a rail angle between said rails and a tangent line of a corresponding one of said tracks over which said body is positioned, wherein said rail angle is substantially zero when said body is positioned over an innermost track and said rail angle increases as said body moves radially away from said innermost track; and wherein said longitudinal central axis of said body coincides with a tangent line of an intermediate track when said body is positioned over said intermediate track.

2. A magnetic disk apparatus according to claim 1, wherein each of the head arms carries two floating sliders via spring arms, respectively, and each of the floating sliders includes two magnetic heads.

3. A magnetic disk apparatus according to claim 2, wherein the magnetic head comprises a thin film magnetic head.

4. A magnetic disk apparatus according to claim 2, wherein the body of the floating slider has a rear surface, viewed from the direction of the rotation of the magnetic disks, and the magnetic heads are arranged on the rear surface of the body.

5. A magnetic disk apparatus according to claim 1, wherein the magnetic head has a magnetic gap which is located at the position of the rail.

6. A magnetic disk apparatus according to claim 1, wherein the body of the floating slider has a rear surface, viewed from the direction of the rotation of the magnetic disks, and the at least one magnetic head is arranged on the rear surface of the body.

7. A magnetic disk apparatus according to claim 6, wherein each of the at least one magnetic heads has a magnetic gap which is located at a position between the rails.

8. A magnetic disk apparatus according to claim 1, wherein the body of the floating slider has a front and a rear, viewed from the direction of the rotation of the magnetic disks, and a portion of each of the rails is tapered to the front of the body.

* * * * *

UNITED STATES PATENT AND TRADEMARK OFFICE
CERTIFICATE OF CORRECTION

PATENT NO. : 6,141,181  Page 1 of 1
DATED : October 31, 2000
INVENTOR(S) : Yoshinori Kadowaki It is certified that error appears in the above-identified patent and that said Letters Patent is hereby corrected as shown below:

Title page,
Item [56], References Cited, for Japanese reference 60-47278 please delete "3/1958" and insert -- 3/1958 -- therefor.

Signed and Sealed this

First Day of January, 2002

Attest:

Attesting Officer

JAMES E. ROGAN
Director of the United States Patent and Trademark Office